(12) United States Patent
Kokume et al.

(10) Patent No.: US 11,229,975 B2
(45) Date of Patent: Jan. 25, 2022

(54) BUTT LASER-WELDING METHOD FOR METALLIC MEMBER

(71) Applicant: TOYOTA JIDOSHA KABUSHIKI KAISHA, Toyota (JP)

(72) Inventors: Masanori Kokume, Okazaki (JP); Shinichi Washizu, Aichi-gun (JP); Yosuke Tateya, Toyota (JP); Daisuke Noritake, Nagoya (JP); Yuki Kawashita, Okazaki (JP); Jun Ikarashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 300 days.

(21) Appl. No.: 16/353,277

(22) Filed: Mar. 14, 2019

(65) Prior Publication Data

US 2019/0299333 A1    Oct. 3, 2019

(30) Foreign Application Priority Data

Mar. 28, 2018  (JP) .............................. JP2018-062436

(51) Int. Cl.
| | |
|---|---|
| *B23K 26/242* | (2014.01) |
| *B23K 26/082* | (2014.01) |
| *B23K 26/26* | (2014.01) |
| *B23K 26/02* | (2014.01) |
| *B23K 26/042* | (2014.01) |
| *B23K 26/32* | (2014.01) |
| *B23K 101/18* | (2006.01) |
| *B23K 103/10* | (2006.01) |

(Continued)

(52) U.S. Cl.
CPC ............ *B23K 26/242* (2015.10); *B23K 26/02* (2013.01); *B23K 26/042* (2015.10); *B23K 26/082* (2015.10); *B23K 26/26* (2013.01); *B23K 26/32* (2013.01); *B23K 2101/006* (2018.08); *B23K 2101/18* (2018.08); *B23K 2103/04* (2018.08); *B23K 2103/10* (2018.08)

(58) Field of Classification Search
CPC ..... B23K 26/082; B23K 26/242; B23K 26/26
See application file for complete search history.

(56) References Cited

U.S. PATENT DOCUMENTS

| | | | |
|---|---|---|---|
| 5,250,783 A | * | 10/1993 | Nishi ..................... B23K 26/26 219/121.64 |
| 5,393,956 A | * | 2/1995 | Guth ..................... B23K 26/24 219/121.64 |

(Continued)

FOREIGN PATENT DOCUMENTS

| | | |
|---|---|---|
| CN | 105246637 A | 1/2016 |
| DE | 10 2013 110 523 A1 | 3/2015 |

(Continued)

*Primary Examiner* — Erin E McGrath
(74) *Attorney, Agent, or Firm* — Sughrue Mion, PLLC

(57) ABSTRACT

Provided is a butt laser-welding method for a metallic member in which a laser beam is scanned so as to repeatedly cross butting surfaces of metallic members to weld the metallic members to each other. When the laser beam is scanned so as to cross the butting surfaces, the closer the laser beam comes to the butting surfaces, the more an irradiation energy density of the laser beam is increased. The bottom surfaces of the molten pools formed on the metallic members are inclined so as to descend toward the butting surfaces.

3 Claims, 9 Drawing Sheets

(51) Int. Cl.
*B23K 101/00* (2006.01)
*B23K 103/04* (2006.01)

(56) References Cited

U.S. PATENT DOCUMENTS 6,087,619 A * 7/2000 Berkmanns .......... B23K 26/032
219/121.63
2014/0291304 A1 10/2014 Mudd, II

FOREIGN PATENT DOCUMENTS

| | | |
|---|---|---|
| JP | 2-80187 A | 3/1990 |
| JP | 2003-170284 A | 6/2003 |
| JP | 5318543 B2 | 10/2013 |
| JP | 2015-202708 A | 11/2015 |
| JP | 2016-521208 A | 7/2016 |
| WO | 96/33041 A1 | 10/1996 |

* cited by examiner

BUTT LASER-WELDING METHOD FOR METALLIC MEMBER

CROSS REFERENCE TO RELATED APPLICATIONS

This application is based upon and claims the benefit of priority from Japanese patent application No. 2018-062436, filed on Mar. 28, 2018, the disclosure of which is incorporated herein in its entirety by reference.

BACKGROUND

The present disclosure relates to a butt laser-welding method for a metallic member.

When metallic members such as steel sheets are butted against each other to perform laser welding thereon, a gap (space) or a height difference between the butting surfaces varies in size. Consequently, there has been a possibility that in a part where a gap or a height difference is large, welding cannot be performed or a sufficient throat depth cannot be obtained. Therefore, a butt laser-welding method which is excellent in welding tolerance to a gap and a height difference has been desired.

Thus, in a butt laser-welding method disclosed in Japanese Unexamined Patent Application Publication No. 2015-202708, an acute-angle corner part is formed on a butting surface of one metallic member, and the acute-angle corner part is projected from a butting surface of the other metallic member to be irradiated with a laser beam thereon.

SUMMARY

The inventors have found the following problems in regard to the butt laser-welding method disclosed in Japanese Unexamined Patent Application Publication No. 2015-202708.

In the butt laser-welding method disclosed in Japanese Unexamined Patent Application Publication No. 2015-202708, it is conceivable that since an acute-angle corner projected from butting surfaces is preferentially melted to flow into a gap, welding tolerance to the gap improves.

However, there has been a problem that it is necessary to perform processing for forming an acute-angle corner part on a butting surface of one metallic member and thus the productivity becomes poor.

The present disclosure has been made in view of the above situation, and provides a butt laser-welding method for a metallic member that is excellent in both welding tolerance and productivity.

A first exemplary aspect is a butt laser-welding method for a metallic member in which a laser beam is scanned so as to repeatedly cross butting surfaces of metallic members to weld them to each other, in which when the laser beam is scanned so as to cross the butting surfaces, the closer the laser beam comes to the butting surfaces, the more an irradiation energy density of the laser beam is increased.

In the butt laser-welding method for a metallic member according to the first exemplary aspect, when the laser beam is scanned so as to cross the butting surfaces, the closer the laser beam comes to the butting surfaces, the more the irradiation energy density of the laser beam is increased. Therefore, bottom surfaces of molten pools respectively formed on butted metallic members can be inclined so as to descend toward the butting surfaces. As a result, the molten pools respectively formed on the metallic members flow toward a gap due to gravity and thus they are easily bonded to each other. Therefore, welding tolerance to a gap and a height difference improves. Further, no particular processing is necessary for the butting surfaces, and it is excellent in productivity. That is, the butt laser-welding method for a metallic member according to the first exemplary aspect is excellent in both welding tolerance and productivity.

The irradiation energy density may be increased by reducing a scanning speed of the laser beam as the laser beam comes closer to the butting surfaces, the laser beam being scanned by a galvano scanner. It is possible to vary the irradiation energy density by quickly and simply varying the scanning speed of the laser beam.

Further, the laser beam may be scanned along the butting surfaces while the laser beam is caused to meander so as to cross the butting surfaces. The laser beam does not cross the molten pools, and thus generation of spatter can be prevented.

During welding of the metallic members, a gap in a part to be scanned by the laser beam is detected in the butting surfaces, and a swing width of the laser beam may be changed based on the detected gap so that the larger the gap is, the more the swing width of the laser beam crossing the butting surfaces increases. Welding tolerance to the gap can be further improved.

According to the present disclosure, it is possible to provide a butt laser-welding method for a metallic member that is excellent in both welding tolerance and productivity.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments of the disclosure will be described in detail with reference to the accompanying drawings. However, the disclosure is not limited to the embodiments. For the purpose of clear explanation, the following description and the drawings are appropriately simplified.

First Embodiment

<Butt Laser-Welding Method>

Figure 1:
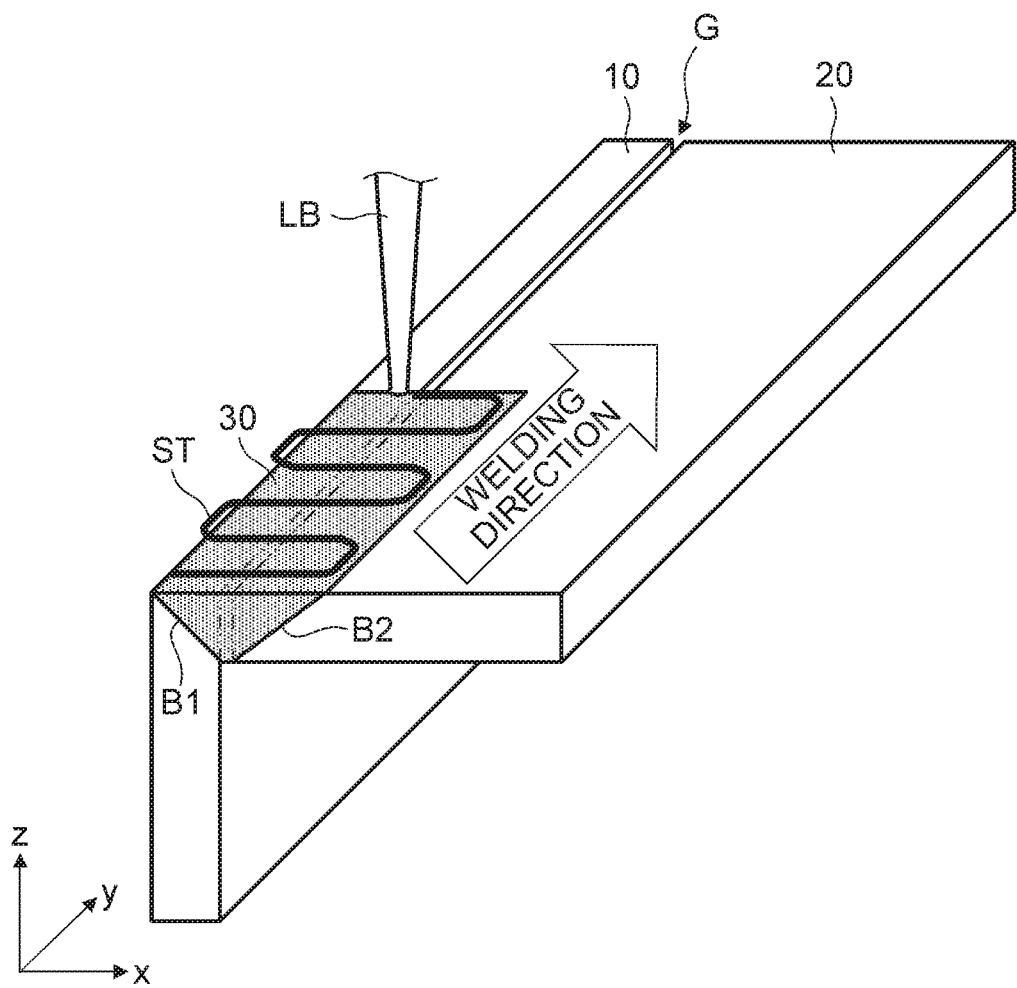
FIG. 1 is a schematic perspective view showing a butt laser-welding method according to a first embodiment.
Figure 2:
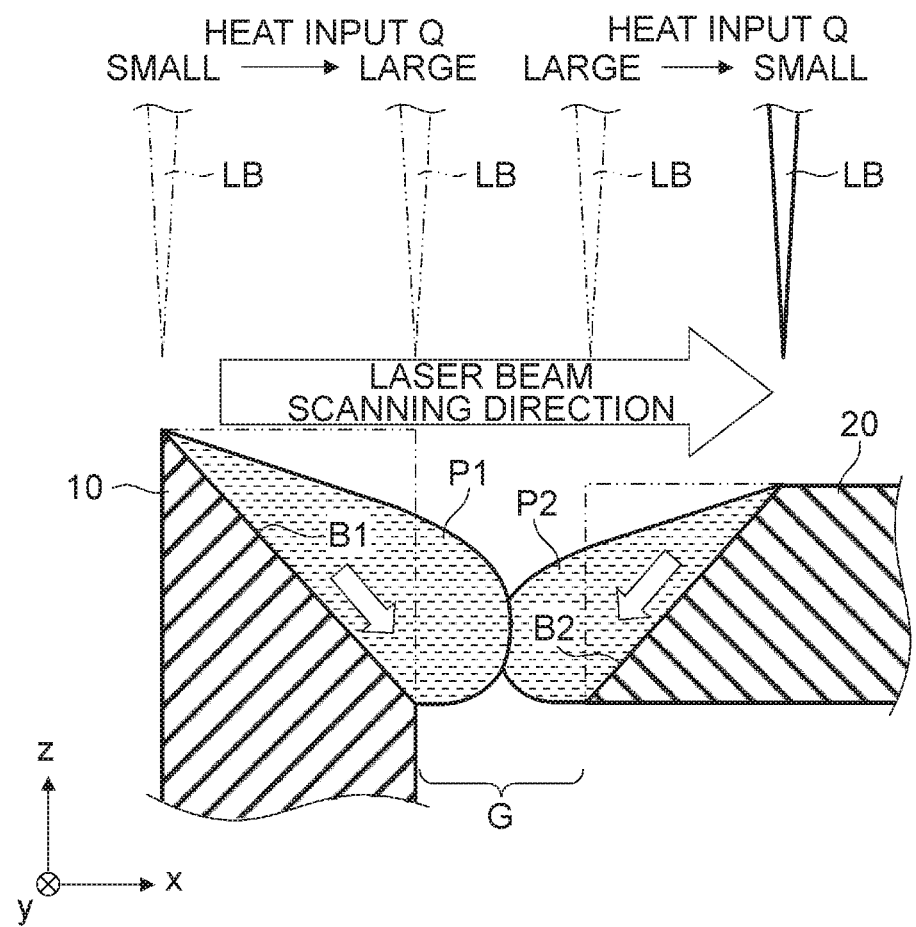
FIG. 2 is a conceptual cross-sectional view showing a state during welding of the metallic members in the butt laser-welding method according to the first embodiment.
Figure 3:
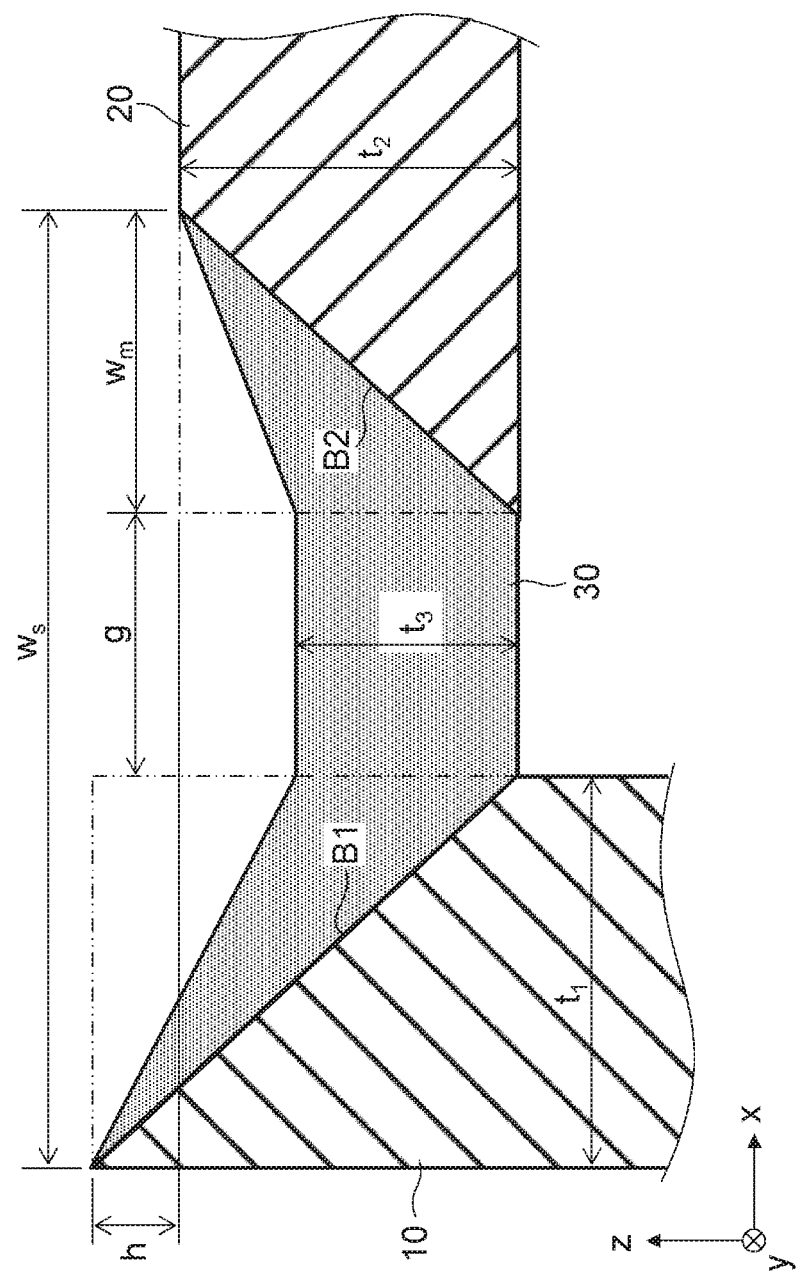
FIG. 3 is a schematic cross-sectional view showing a state after welding of the metallic members in the butt laser-welding method according to the first embodiment.

First, a butt laser-welding method according to a first embodiment is described with respect to FIGS. 1 to 3. FIG. 1 is a schematic perspective view showing the butt laser-welding method according to the first embodiment. FIG. 2 is a conceptual cross-sectional view showing a state during welding of the metallic members in the butt laser-welding method according to the first embodiment. FIG. 3 is a schematic cross-sectional view showing a state after welding of the metallic members in the butt laser-welding method according to the first embodiment.

Note that it is obvious that right-handed xyz orthogonal coordinates shown in FIG. 1 and other drawings are merely for convenience of describing the positional relationship of the components. Normally, a z-axis positive direction is vertically upward and a xy plane is a horizontal plane, which are the same throughout the drawings.

As shown in FIG. 1, in the butt laser-welding method according to the first embodiment, a welded part 30 is grown along the butting surfaces while a laser beam LB is irradiated so as to repeatedly cross the butting surfaces of a metallic member 10 and a metallic member 20. The metallic members 10 and 20 are, for example, steel plates for automobiles or aluminum plates, but are not limited thereto. As a laser welding apparatus, for example, a remote laser welding apparatus incorporating a galvano scanner can be used. It is possible for the galvano scanner to scan the laser beam LB at high speed. Note that in the welded part 30 shown in FIG. 1, the contours of the metallic members 10 and 20 before they are melted are indicated by dash-dot-dot lines.

In an example of FIG. 1, both of the metallic members 10 and 20 are plate members extending in the y-axis direction. Note that the metallic member 10 is fixed so that the main surface thereof is perpendicular to a horizontal plane (xy plane), and the metallic member 20 is fixed so that the main surface thereof is parallel to the horizontal surface (xy plane). Further, an upper end of the main surface of the metallic member 10 and an end surface of the metallic member 20 are butted against each other to scan the laser beam LB from the upper end surface of the metallic member 10 to a top surface (an upper side of the main surface) of the metallic member 20. Specifically, the laser beam LB is scanned so as to travel in the y-axis direction while it is caused to meander in the x-axis direction. In FIG. 1, a scanning trajectory ST of the laser beam LB is indicated by a thick solid line.

The scanning trajectory ST of the laser beam LB is not particularly limited as long as it is a shape repeatedly crossing the butting surfaces of the metallic members 10 and 20. For example, a shape of the scanning trajectory ST may be a zigzag shape by weaving, or a spiral shape by wobbling shown in FIG. 7 which will be described later.

As schematically emphatically shown in FIG. 1, a gap G is formed between the butting surfaces of the metallic members 10 and 20. As shown in FIG. 1, a bottom surface B1 (an interface with the metallic member 10) of the welded part 30 formed by the butt laser-welding method according to the first embodiment is inclined so as to descend toward the butting surface. Similarly, a bottom surface B2 (an interface with the metallic member 20) of the welded part 30 is inclined so as to descend toward the butting surface.

Details of the butt laser-welding method according to the first embodiment are described below with reference to FIGS. 2 and 3. FIG. 2 shows a state in which the laser beam LB is scanned in the x-axis positive direction from the upper end surface of the metallic member 10 to the upper surface of the metallic member 20. As shown in FIG. 2, the butting surface of the metallic member 10 is melted by the irradiation of the laser beam LB, thereby forming a molten pool P1. Similarly, the butting surface of the metallic member 20 is melted by the irradiation of the laser beam LB, thereby forming a molten pool P2. By making the laser beam LB scan in the x-axis direction so as to cross the butting surfaces, the molten pools P1 and P2 are oscillated in the x-axis direction.

Note that the case where the laser beam LB is scanned in the x-axis negative direction is the same as the case above, and thus the description thereof is omitted.

By bonding the molten pools P1 and P2 while they are oscillated, the metallic members 10 and 20 are welded to each other. That is, a molten pool formed by bonding the molten pools P1 and P2 is solidified after welding of the metallic members 10 and 20, and the welded part 30 is thereby formed as shown in FIG. 3. Note that in FIGS. 2 and 3, the contours of the metallic members 10 and 20 before they are melted are indicated by dash-dot-dot lines.

Note that in the butt laser-welding method according to the first embodiment, as shown in FIG. 2, when the laser beam LB is irradiated onto the metallic member 10, the closer the laser beam LB comes to the butting surfaces, i.e., the gap G, the more a heat input Q by the laser beam LB is increased. The larger the heat input Q by the laser beam LB is, the more a molten depth in the metallic member 10 is increased. Therefore, the bottom surface B1 of the molten pool P1 is inclined so as to descend toward the butting surface. As a result, as indicated by the outline arrow in FIG. 2, the molten pool P1 easily flows toward the gap G.

On the other hand, when the laser beam LB is irradiated onto the metallic member 20, the farther the laser beam LB goes away from the butting surfaces, i.e., the gap G, the more the input heat Q by the laser beam LB is reduced. In other words, in the metallic member 20, the closer the laser beam LB comes to the butting surface, i.e., the gap G, the more the heat input Q is increased. The larger the heat input Q by the laser beam LB is, the more a molten depth in the metallic member 20 is increased. Therefore, the bottom surface B2 of the molten pool P2 is inclined so as to descend toward the butting surface. As a result, as indicated by the outline arrow in FIG. 2, the molten pool P2 easily flows toward the gap G.

Figure 4:
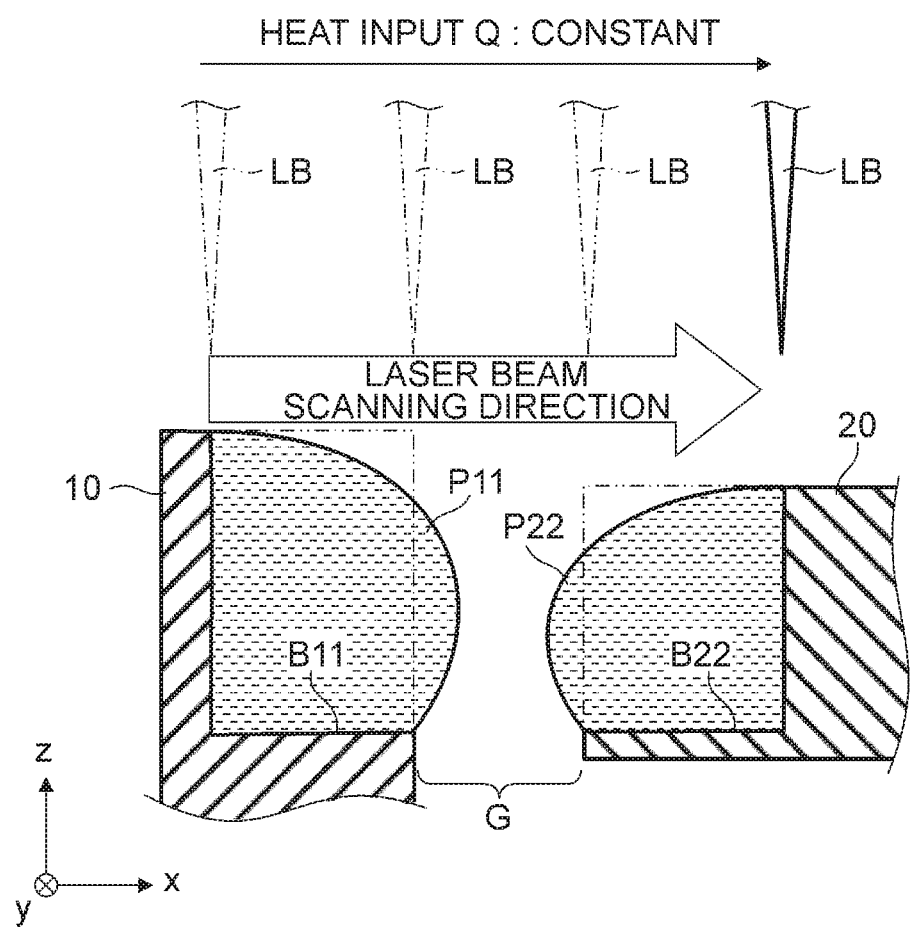
FIG. 4 is a conceptual cross-sectional view showing a state during welding of the metallic members in the butt laser-welding method according to a comparative example.

Note that FIG. 4 is a conceptual cross-sectional view showing a state during welding of the metallic members in the butt laser-welding method according to a comparative example. FIG. 4 corresponds to FIG. 2. As shown in FIG. 4, in the butt laser-welding method according to the comparative example, the input heat Q by the laser beam LB is constant, and thus a bottom surface B11 of a molten pool P11 and a bottom surface B22 of a molten pool P22 become horizontal. Therefore, the molten pools P11 and P22 are not forced to flow into the gap G. Note that also in comparative example, by making the laser beam LB scan in the x-axis direction so as to cross the butting surfaces, the molten pools P1 and P2 are oscillated in the x-axis direction. Therefore, the molten pools P11 and P22 can be bonded to each other.

On the other hand, in the butt laser-welding method according to the first embodiment, in the butted metallic members 10 and 20, the closer the laser beam LB comes to the butting surfaces, the heat input Q by the laser beam LB is increased, and the bottom surfaces B1 and B2 of the molten pools P1 and P2 are inclined so as to descend toward the butting surfaces, as shown in FIG. 2. As a result, the molten pools P1 and P2 flow toward the Gap G due to gravity and thus they are easily bonded to each other. Therefore, welding tolerance to a gap and a height difference improves as compared with the comparative example. Further, no particular processing is necessary for the butting surfaces, and it is excellent in productivity. That is, the butt laser-welding method according to the first embodiment is excellent in both welding tolerance and productivity.

Next, a method for determining a swing width $w_s$ of the laser beam LB for achieving a target throat depth $t_3$ is described with reference to FIG. 3. For example, the target throat depth $t_3$ is approximately 70% of a thickness $t_2$ of the metallic member 20. That is, for example, it is assumed that $t_3=0.7t_2$ holds.

As shown in FIG. 3, the swing width $w_s$ is a total value of a thickness $t_1$ of the metallic member 10, a gap width g, and a molten width $w_m$ of the metallic member 20, and can be expressed by the following expression (1).

$$w_s = t_1 + g + w_m \quad (1)$$

That is, when the molten width $w_m$ of the metallic member 20 is determined, the swing width $w_s$ can be determined. Note that the sum total of a cross-sectional area $S_1$ of a molten part of the metallic member 10 and a cross-sectional area $S_2$ of a molten part of the metallic member 20, which are indicated by the dash-dot-dot lines in FIG. 3, are ideally equal to a cross-sectional area $S_3$ of the welded part 30. Accordingly, based on this geometric relationship, the swing width $w_s$ can be determined.

The cross-section of the molten part of the metallic member 10 is triangular, and the cross-sectional area $S_1$ thereof can be expressed by the following expression (2) using the thickness $t_1$ of the metallic member 10, the thickness $t_2$ of the metallic member 20, and a height difference h between the metallic members 10 and 20.

$$S_1 = t_1(t_2+h)/2 \quad (2)$$

The cross-section of the molten part of the metallic member 20 is also triangular, and the cross-sectional area $S_2$ thereof can be expressed by the following expression (3) using the thickness $t_2$ and the molten width $w_m$ of the metallic member 20.

$$S_2 = t_2 \times w_m/2 \quad (3)$$

As shown in FIG. 3, the cross-sectional area $S_3$ of the welded part 30 is the sum total of a triangle area having a base $t_3$ and a height $t_1$, a triangle area having a base $t_3$ and a height $w_m$, and a rectangle area having a height $t_3$ and a width g. Accordingly, it can be expressed by the following expression (4).

$$S_3 = t_3 \times t_1/2 + t_3 \times w_m/2 + t_3 \times g \quad (4)$$

As described above, since the sum total of the cross-sectional areas $S_1$ and $S_2$ is equal to the cross-sectional area $S_3$, the following expression (5) holds based on the expressions (2) to (4).

$$t_1(t_2+h)/2 + t_2 \times w_m/2 = t_3 \times t_1/2 + t_3 \times w_m/2 + t_3 \times g \quad (5)$$

Solving the expression (5) for the molten width $w_m$ obtains the following expression (6).

$$w_m = \{2g \times t_3 + t_1(t_3-t_2-h)\}/(t_2-t_3) \quad (6)$$

Then, substituting the expression (6) into the expression (1) obtains the swing width $w_s$ based on the following expression (7).

$$w_s = t_1 + g + \{2g \times t_3 + t_1(t_3-t_2-h)\}/(t_2-t_3) \quad (7)$$

It can be understood from the expression (7) that the larger the gap width g is, the more the swing width $w_s$ may be increased. On the other hand, it can be understood from the expression (7) that the smaller the height difference h is, the more the swing width $w_s$ is increased. Note that it is obvious from FIG. 3 that although the gap width g cannot be a negative value, the height difference h can be a negative value.

The swing width $w_s$ may be determined from assumed maximum gap width g and minimum height difference h by using the expression (7), and the determined swing width $w_s$ may be set as a fixed value. Alternatively, during welding of the metallic members, the swing width $w_s$ may be feedback-controlled as required by using the expression (7) while the gap width g and the height difference h are detected in a part to be welded by a tracking sensor, etc.

Figure 5:
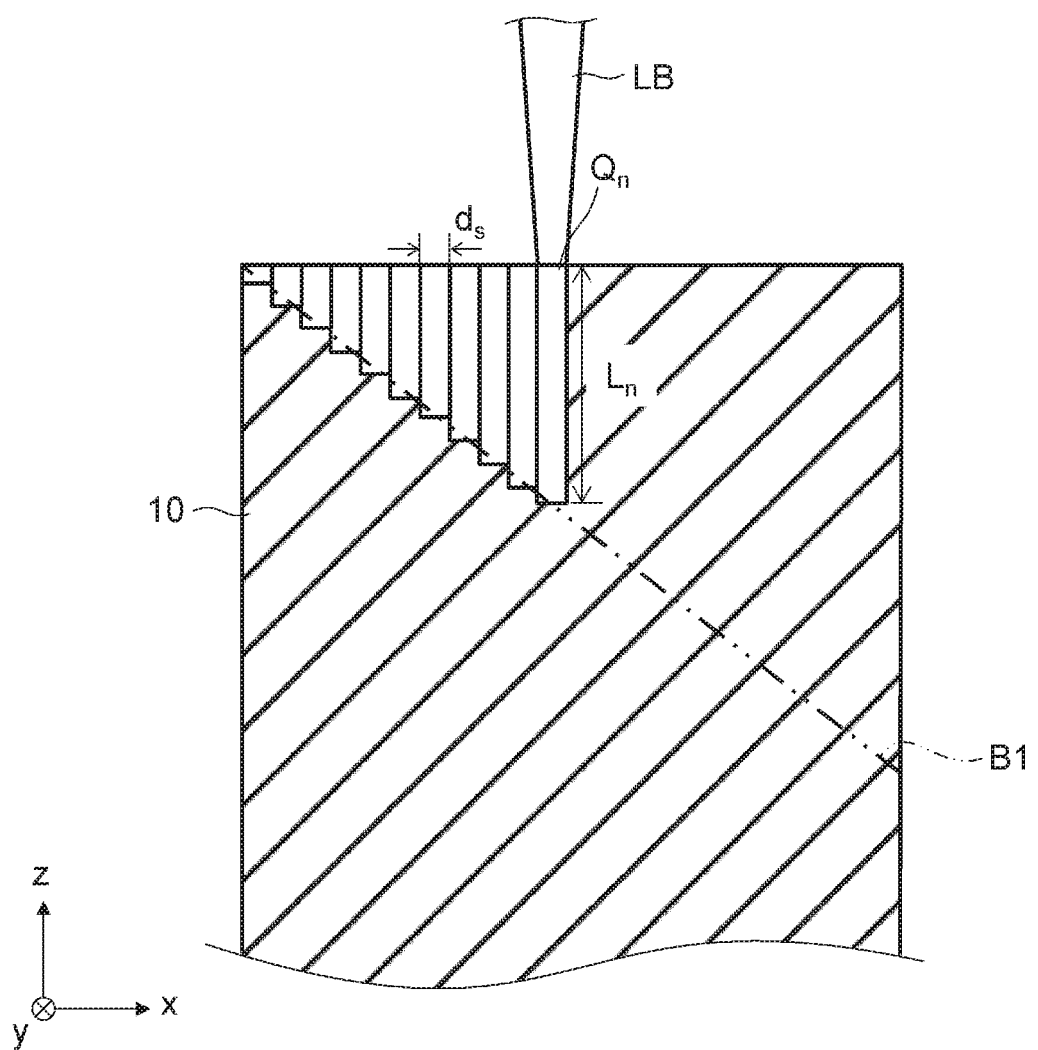
FIG. 5 is a conceptual cross-sectional view showing a heat input Q in the butt laser-welding method according to the first embodiment.

Next, a method for controlling the heat input Q to incline the bottom surface B1 of the molten pool P1 so that it descends toward the butting surfaces is described with reference to FIG. 5. FIG. 5 is a conceptual cross-sectional view showing the heat input Q in the butt laser-welding method according to the first embodiment. In an example of FIG. 5, the heat input Q is controlled by dividing the thickness $t_1$ of the metallic member 10 by a spot diameter $d_s$ of the laser beam LB.

The n-th (n is a natural number) heat input $Q_n$ counted from the side of the main surface opposite to the butting surface of the metallic member 10, as shown in FIG. 5, is now examined. The heat input $Q_n$ is an amount of heat necessary for melting a cylindrical metal having a spot area $S_s$ ($=\pi d_s^2/4$) as a bottom area and a molten depth $L_n$ as a height. Accordingly, the heat input $Q_n$ can be expressed by the following expression (8) using a metal density $\rho$, a melting point $T_m$, a heat of fusion $c_m$, a specific heat c, and a room temperature $T_0$.

$$Q_n = \rho \times S_s \times L_n \times \{c \times (T_m-T_0)+c_m\} \quad (8)$$

On the other hand, when it is assumed that an irradiation energy of the laser beam LB is all consumed as the heat input $Q_n$, the heat input $Q_n$ is the product of an irradiation energy density E of the laser beam LB and the spot area $S_s$. Therefore, it can be expressed by the following expression (9).

$$Q_n = E \times S_s \quad (9)$$

The following expression (10) holds based on the expressions (8) and (9).

$$\rho \times S_s \times L_n \times \{c \times (T_m-T_0)+c_m\} = E \times S_s \quad (10)$$

Solving the expression (10) for the molten depth $L_n$ obtains the following expression (11).

$$L_n = E/[\rho\{c \times (T_m-T_0)+c_m\}] \quad (11)$$

As indicated by the expression (11), the molten depth $L_n$ is proportional to the irradiation energy density E. Therefore, as shown in FIG. 5, in order to gradually deepen the molten depth, the irradiation energy density E may be gradually increased. Note that the irradiation energy density E can be generally expressed by the following expression (12) using a laser output P, a scanning speed $v_s$, and the spot diameter $d_s$.

$$E=P/(v_s \times d_s) \quad (12)$$

It can be understood from the expressions (11) and (12) that in order to deepen the molten depth, the laser output P may be increased, or the scanning speed $v_s$ or the spot diameter $d_s$ may be reduced.

Another Embodiment

Note that, for example, in the case where a lower end of the metallic member 10 has an L-shaped cross-section by being bent in the x-axis positive direction in FIG. 1 (more specifically, the case where the welded metallic members 10 and 20 constitute a cylindrical body), there is a possibility that the inner surface of the metallic member 10 might be irradiated with the laser beam LB that has passed through the gap G and might be partially melted so as to be damaged.

Therefore, while the laser beam LB passes through the gap G, the irradiation energy density E may be reduced as much as possible by increasing the scanning speed $v_s$, reducing the laser output P, or the like. Alternatively, a protective plate for protecting the metallic member 10 from the laser beam LB may be provided in a part in the metallic member 10 onto which the laser beam LB can be unintentionally irradiated.

Further, a material thickness of that part in the metallic member 10 may be thicker than that of other parts thereof. Further, it is preferred that no holes or pins for determining positions be provided in the part in the metallic member 10 onto which the laser beam LB can be unintentionally irradiated.

EXAMPLE

The butt laser-welding method according to the first embodiment is described below in detail with a comparative example and an example. However, the butt laser-welding method according to the first embodiment is not limited to the following example.

<Test Conditions>

First, test conditions in the butt laser-welding methods according to the comparative example and the example are described. In the butt laser-welding methods according to the comparative example and the example, welding tolerance was investigated by changing the gap width g and the height difference h shown in FIG. 3. The gap width g was changed at intervals of 0.2 mm from 0 to 1.0 mm. The height difference h was changed at intervals of 0.2 mm from −0.5 to 0.5 mm. The thickness $t_1$ of the metallic member 10 and the thickness $t_2$ of the metallic member 20 were respectively 2.3 mm, and then welding was performed three times under each condition. The target throat depth $t_3$ shown in FIG. 3 was 70% of the thickness $t_2$ of the metallic member 20, and it was determined that welding can be performed when a throat depth was greater than the target throat depth $t_3$ at all three times.

Table 1 summarizes the test conditions in the butt laser-welding methods according to the comparative example and the example. As shown in Table 1, the laser output P was set to 6000 W and a defocus amount was set to 20 mm in both the butt laser-welding methods according to the comparative example and the example.

TABLE 1

| | Example | Comparative example |
|---|---|---|
| Laser output P (W) | 6000 | |
| Scanning speed $v_s$ (m/min) | Central Part: 19.5 Ends: 128.1 | 16.1 |
| Welding speed $v_w$ (m/min) | 1.63 | 1.5 |
| Swing width $w_s$ (mm) | 5.67 | 4.6 |
| Traveling direction width $w_t$ (mm) | — | 2.0 |
| Pitch p (mm) | 0.285 | 1.0 |
| Defocus amount (mm) | 20 | |

Figure 6:
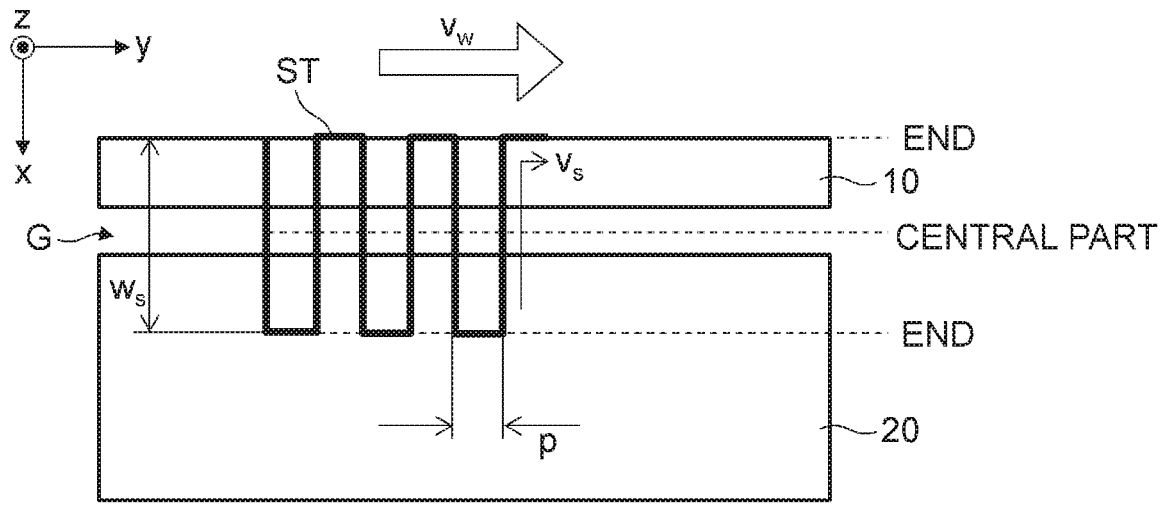
FIG. 6 is a schematic plan view showing a scanning trajectory ST of a laser beam LB in the butt laser-welding method according to an example.

FIG. 6 is a schematic plan view showing the scanning trajectory ST of the laser beam LB in the butt laser-welding method according to the example. As shown in FIG. 6 and Table 1, in the example, a pitch p was set to 0.285 mm, the swing width $w_s$ was set to 5.67 mm, and welding was performed in the y-axis direction while the laser beam LB was caused to meander in the x-axis direction. The scanning speed $v_s$ of the laser beam LB was gradually changed so as to be 19.5 m/min and 128.1 m/min at the central part and the ends which are shown in FIG. 6, respectively. A welding speed $v_w$ in the y-axis direction was 1.63 m/min.

Figure 7:
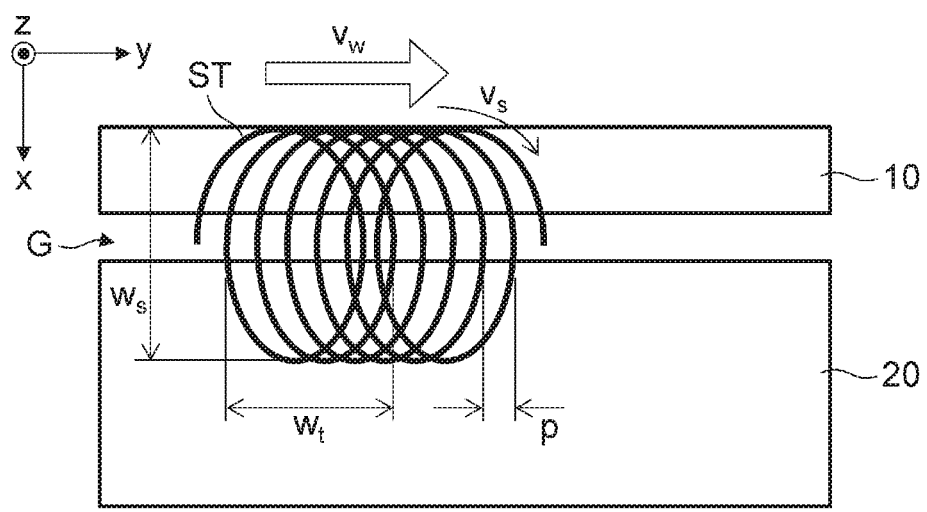
FIG. 7 is a schematic plan view showing the scanning trajectory ST of the laser beam LB in the butt laser-welding method according to a comparative example.

FIG. 7 is a schematic plan view showing the scanning trajectory ST of the laser beam LB in the butt laser-welding method according to the comparative example. As shown in FIG. 7 and Table 1, in the comparative example, the pitch p was set to 1.0 mm, the swing width $w_s$ was set to 4.6 mm, a traveling direction width $w_t$ was set to 2.0 mm, and welding was performed in the y-axis direction while the laser beam LB was scanned in a spiral manner. The scanning speed $v_s$ of the laser beam LB was set to 16.1 m/min. The welding speed $v_w$ in the y-axis direction was set to 1.5 m/min.

<Test Results>

Figure 8:
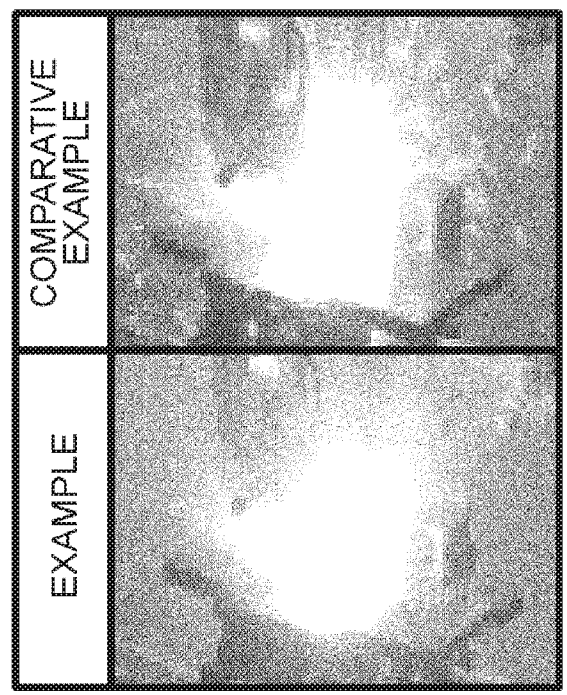
FIG. 8 are macrophotographs showing states where spatter was generated from molten pools during welding of the metallic members in the comparative example and the example.

FIG. 8 are macrophotographs showing states where spatter was generated from molten pools during welding of the metallic members in the comparative example and the example. As shown in FIG. 8, in the butt laser-welding method according to the example, less spatter was generated than in the comparative example. As shown in FIG. 7, the scanning trajectory ST of the laser beam LB is spiral in the comparative example. Accordingly, spatter is easily generated when the laser beam LB crosses the molten pools. In contrast to this, as shown in FIG. 6, since the scanning trajectory ST of the laser beam LB is caused to meander in the example, the laser beam LB does not cross the molten pools, which prevents spatter from being generated.

Figure 9:
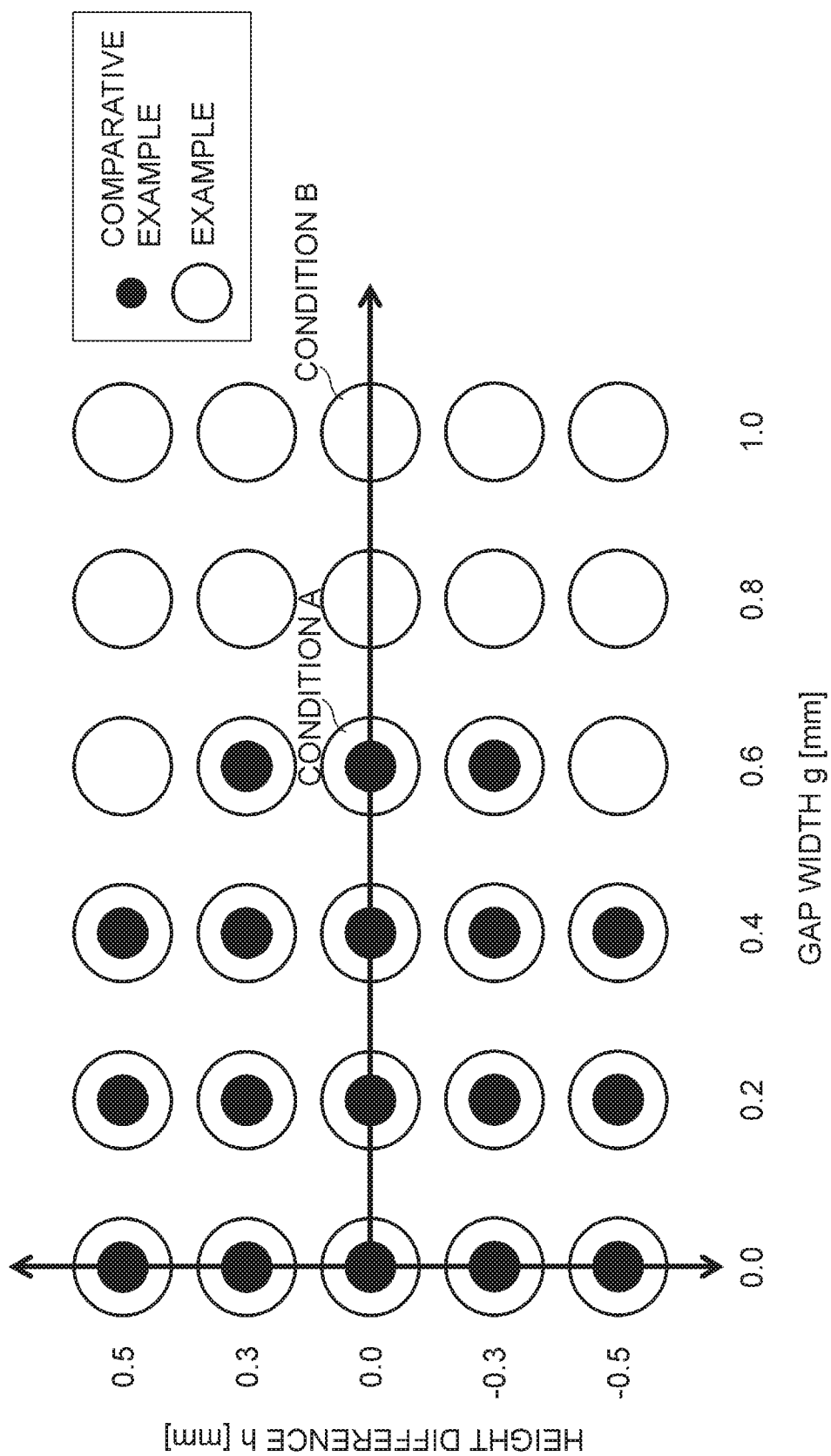
FIG. 9 is a map showing welding tolerance to a gap and a height difference in the comparative example and the example.

Next, FIG. 9 is a map showing welding tolerance to the gap and the height difference in the comparative example and the example. In FIG. 9, the horizontal axis indicates the gap width g (mm) and the vertical axis indicates the height difference h (mm). The black circles indicate conditions in which welding can be performed in the comparative example. On the other hand, the white circles indicate conditions in which welding can be performed in the example. As shown in FIG. 9, in the example, it becomes possible to perform welding even under the conditions in which welding cannot be performed in the comparative example, and thereby welding tolerance to the gap and the height difference remarkably improved as compared with the comparative example.

Figure 10:
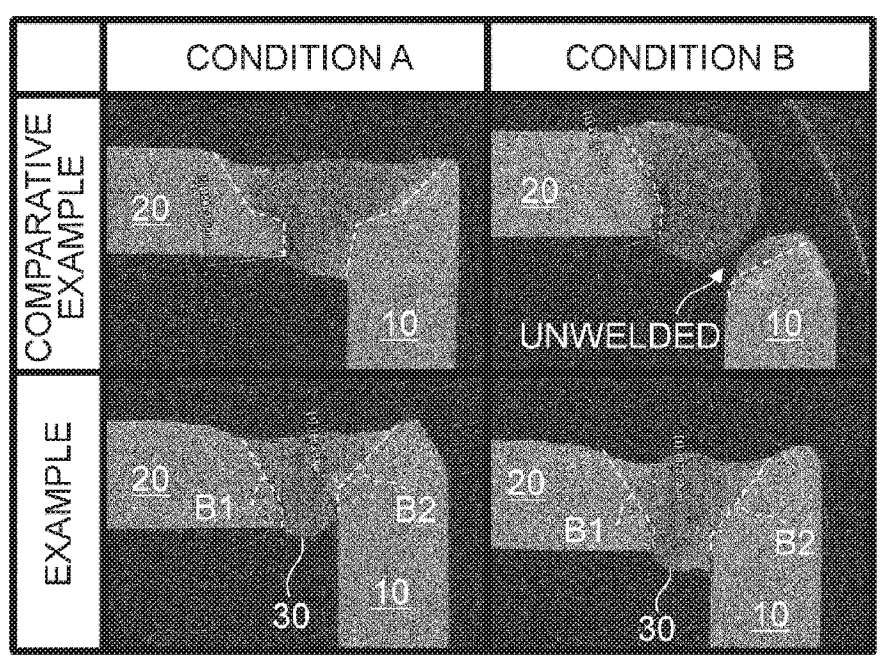
FIG. 10 shows microphotographs of welded parts 30 according to the comparative example and the example under conditions A and B in the gap and the height difference shown in FIG. 9.

FIG. 10 shows microphotographs of the welded parts 30 according to the comparative example and the example under conditions A and B in the gap and the height difference shown in FIG. 9. In the comparative example, as shown in FIG. 10, although it was possible to perform welding under the condition A, it was not possible to perform welding under the condition B because the molten pools were not bonded. On the other hand, in the example, it was possible to perform welding under both the conditions A and B as shown in FIG. 10.

In the example, in order to increase the heat input Q in the vicinity of the butting surfaces, the scanning speed $v_s$ of the laser beam LB is reduced as the laser beam LB comes closer to the vicinity of the butting surfaces (the central part in FIG. 6). As a result, as shown in FIG. 10, the molten pools, that is, the bottom surfaces B1 and B2 of the welded part 30 were successfully inclined so as to descend toward the butting surfaces under both the conditions A and B. In the example, as described with reference to FIG. 2, it is estimated that since the molten pools P1 and P2 flowed toward the gap G due to gravity and they were easily bonded to each other, welding tolerance to the gap and the height difference improved as compared with the comparative example.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A butt laser-welding method for a metallic member wherein a laser beam is scanned so as to repeatedly cross butting surfaces of metallic members to weld the metallic members to each other, wherein when the laser beam is scanned so as to cross the butting surfaces, the closer the laser beam comes to the butting surfaces, the more an irradiation energy density E of the laser beam is increased, the irradiation energy density E being expressed by $E=P/(vs \times ds)$, where P is a laser output, vs is a scanning speed of the laser beam, and ds is a spot diameter of the laser beam, during welding of the metallic members, a gap and a height difference in a part to be scanned by the laser beam is detected in the butting surfaces, and a swing width of the laser beam is changed based on the detected gap and the detected height difference so that the larger the detected gap is and the smaller the height difference is, the more the swing width of the laser beam crossing the butting surfaces increases.

2. The butt laser-welding method for a metallic member according to claim 1, wherein the irradiation energy density is increased by reducing a scanning speed of the laser beam as the laser beam comes closer to the butting surfaces, the laser beam being scanned by a galvano scanner.

3. The butt laser-welding method for a metallic member according to claim 1, wherein the laser beam is scanned along the butting surfaces while the laser beam is caused to meander so as to cross the butting surfaces.

* * * * *